(12) United States Patent
Hazarika

(10) Patent No.: US 9,607,291 B2
(45) Date of Patent: Mar. 28, 2017

(54) EMAIL SHARING

(75) Inventor: Surjya Prasad Hazarika, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 453 days.

(21) Appl. No.: 13/324,531

(22) Filed: Dec. 13, 2011

(65) Prior Publication Data
US 2013/0151633 A1 Jun. 13, 2013

(51) Int. Cl.
*G06F 15/16* (2006.01)
*G06Q 10/10* (2012.01)
*H04L 12/58* (2006.01)
*G06Q 50/00* (2012.01)

(52) U.S. Cl.
CPC .......... *G06Q 10/107* (2013.01); *G06Q 50/01* (2013.01); *H04L 51/32* (2013.01); *H04L 51/34* (2013.01)

(58) Field of Classification Search
CPC ...... G06Q 50/01; G06Q 10/107; H04L 51/32; H04L 51/34
USPC .................................. 709/206; 715/751, 752
See application file for complete search history.

(56) References Cited

U.S. PATENT DOCUMENTS

| 6,288,715 B1 * | 9/2001 | Bain et al. ................... 345/211 |
|---|---|---|
| 2002/0124014 A1 * | 9/2002 | Noguchi ................. H04L 67/06 |
| 2004/0051736 A1 * | 3/2004 | Daniell .......................... 345/752 |
| 2008/0005284 A1 * | 1/2008 | Ungar et al. ................... 709/219 |
| 2008/0077676 A1 * | 3/2008 | Nagarajan et al. ........... 709/206 |
| 2008/0109736 A1 * | 5/2008 | Itoh .............................. 715/752 |
| 2009/0013043 A1 * | 1/2009 | Tan ................................ 709/205 |
| 2009/0276732 A1 * | 11/2009 | Dervan .......................... 715/853 |
| 2010/0281122 A1 * | 11/2010 | Li et al. ........................ 709/206 |
| 2010/0318611 A1 * | 12/2010 | Curtin et al. ................. 709/206 |
| 2011/0276637 A1 * | 11/2011 | Thornton et al. ............. 709/206 |
| 2012/0110474 A1 * | 5/2012 | Chen et al. ................... 715/753 |
| 2012/0181330 A1 * | 7/2012 | Kim .............................. 235/375 |
| 2012/0197976 A1 * | 8/2012 | Welingkar et al. ........... 709/203 |
| 2012/0198355 A1 * | 8/2012 | Lau et al. ..................... 715/752 |

OTHER PUBLICATIONS

Jim Lodico (How to turn your email into a social media hub with Posterous, Mar. 3, 2011, http://www.socialmediaexaminer.com/turn-your-email-into-a-social-media-hub-with-posterous, Oct. 2, 2013).*
Fatima Wahab (Use Facebook 'Mobile Upload Email Address' to Post Updates From Google, Jul. 7, 2011, http://www.addictivetips.com/internet-tips/use-facebook-mobile-upload-email-address-to-post-updates-from-google, Oct. 4, 2013).*
Fadel Khudadeh, Yahoo Mail, 2009, http://www.fadelk.com/files/Resources/General/YahooMail.pdf.*

* cited by examiner

*Primary Examiner* — Abdulkader M Alriyashi
(74) *Attorney, Agent, or Firm* — Cooper Legal Group, LLC

(57) ABSTRACT

Sharing email content includes: receiving from a user a selection of an email to share; capturing the subject and content of the email; generating an identifier for the captured subject and content; storing the captured subject and content with the identifier; providing a window with the subject and content for user editing; and transmitting the edited subject and content to the user's social contacts.

21 Claims, 7 Drawing Sheets

FIG. 3

| | |
|---|---|
| Subject | my childhood memories<br>>> User can edit this! |
| Content | Check this out -- a good read!<br>>> User can edit this!<br><br>I wanna talk about my childhood which I think it is a special experience. I used to live in temporary housing area when I was studying in primary school. Temporary housing area is designate (designated) for people living in temporary houses made by wood frames and zinc plates in Hong Kong. Each house is divide (divided) into tiny flats, with one flat per household. Nowadays, you couldn't find any temporary housing area again because they are all demolished by 2001.<br><br>As I remember, I lived there since I was born and until I was promoted to secondary school. Although the living standard was fair, I used to have a happy, wonderful childhood. Most of the furniture in my home, like dining table, chairs, wardrobe, etc. was made by my Dad. It's so unbelievable that my Dad even built a second floor like an attic which is the sleeping place for my Mom, two brothers and me. That's the time that gave me an idea how a carpenter look like. Since my family was poor when I was young, I didn't have toys like Barbie, Lego, to play like my primary school classmates did. Instead, I followed my brothers to venture around. In summertime, we might go to some abandoned garden and climb up the trees to catch cicadas. We tied a thread to one of its legs, it then became our flying toy! Also we might go to stream to catch tadpoles. So I can truly understand how the tail of tadpole disappears while it grows up to become a frog. In winter, we may do lots of outdoor activities like playing soccer, climbing hill so to keep our bodies warm. |
| Images/Documents | [ Browse ] [ Upload ]<br>      475      480 |
| Share | [ SHARE ] with selected Contacts<br>   455 |

EMAIL SHARING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of electronic messaging, and more particularly relates to the field of sharing of electronic messages.

BACKGROUND OF THE INVENTION

Social networking sites have become a wildly popular medium of communication, especially for young people. Young people today are showing a preference for communicating through sites such as Facebook and Twitter, rather than through email. Part of the reason for this is the ease with which someone can share a thought, story, photo, and more with a vast network of contacts with just the press of a button.

Email may be waning as a form of communication among the younger generation who find it easier to disseminate their thoughts to their buddies with the push of a button, rather than typing in email addresses in an email format.

SUMMARY OF THE INVENTION

Briefly, according to an embodiment of the invention a method for sharing email content includes steps or acts of: receiving from a user a selection of an email to share; capturing the subject and content of the email; generating an identifier for the captured subject and content; storing the captured subject and content with the identifier; providing a window with the subject and content for user editing; and transmitting the edited subject and content to the user's social contacts.

According to another embodiment of the present invention, a system for sharing email content includes a memory with computer-executable instructions stored therein, and a processor device for executing the stored instructions. The instructions for enabling a computer to perform: receiving from a user a selection of an email to share; capturing the subject and content of the email; generating an identifier for the captured subject and content; storing the captured subject and content with the identifier; providing a window with the subject and content for user editing; and transmitting the edited subject and content to the user's social contacts.

In another embodiment of the present invention, a computer program product includes a computer-readable storage medium with instructions stored therein for enabling a computer to perform the method steps above for sharing email content.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 3 shows a screenshot of an exemplary email with the share interface, according to an embodiment of the present invention;

FIG. 4 shows the edit box, according to an embodiment of the present invention;

Figure 1:
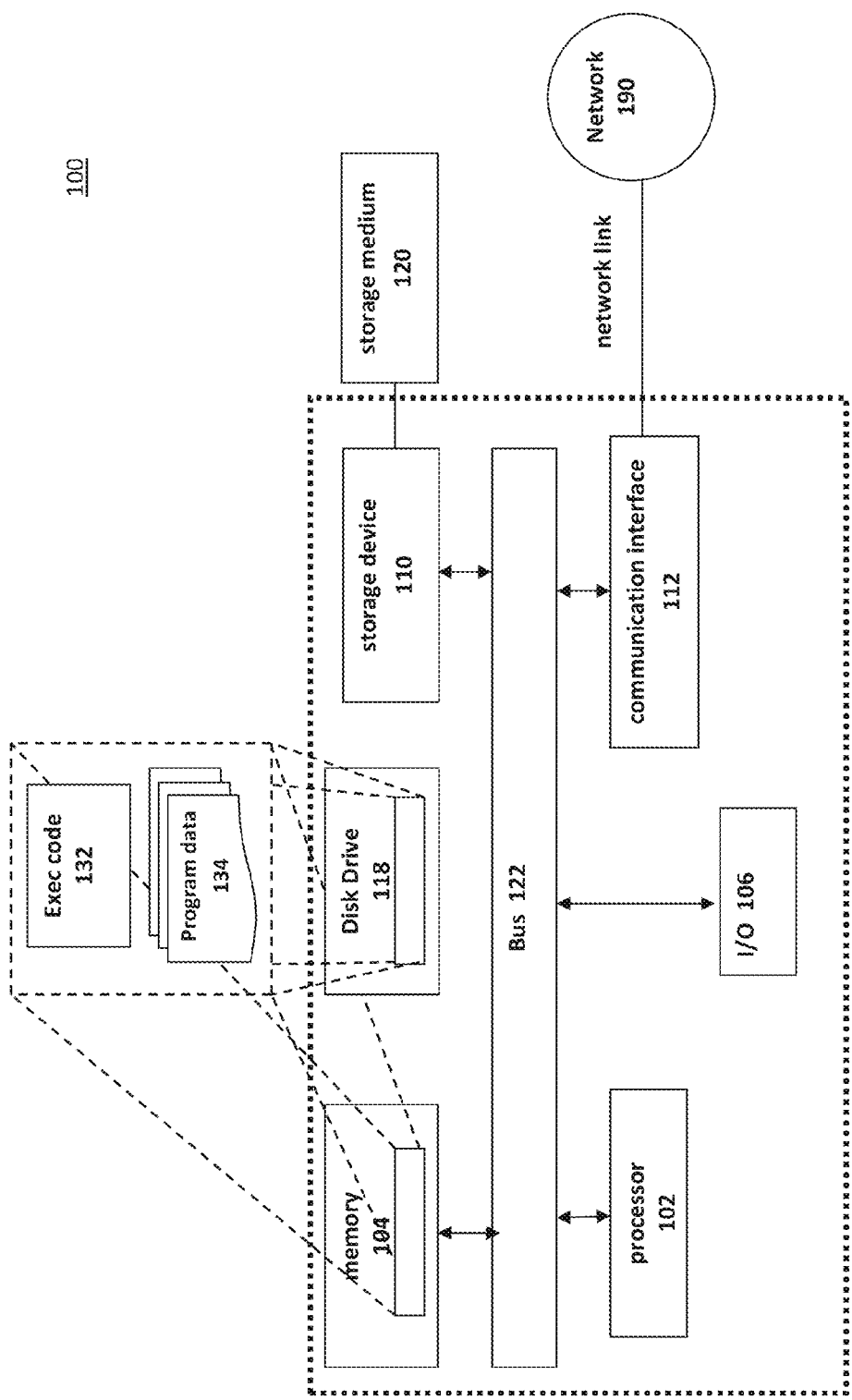
FIG. 1 is a high level block diagram showing an information processing system configured to operate according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a method of sharing interesting emails with our social connections with a one-click button. We can place this button adjacent to the traditional "Forward" button. We are able to feed in the content to be shared into a server. This update can be pulled by various social connection sites such as Yahoo!® Profile, Yahoo!® Messenger, and the like. This will increase user engagement and content contribution.

From a user's perspective, if the intention is to share the email with all of his connections and expect feedback/comments, he/she would opt for this feature rather than forward the email to a subset of his connections. For instance, if a Yahoo!® email user is also a Yahoo!® Profile (formerly Yahoo!® Pulse, a popular social networking site) user and has linked his account with Facebook, a popular social networking site, chances are that the user would prefer to use a one-time share button so that the content is shared both in Yahoo!® Profile and Facebook. In this way all of his/her connections residing in Yahoo!® Profile and Facebook would be able to see and contribute on the update. This is easily done because many users link their profiles in one networking site to other networking sites, such as Facebook and Twitter.

Even if the user wants to share the email with only a few selected contacts rather than all of his/her social contacts, he/she can still share it with already categorized members in his address book. For instance, assume the user is a Yahoo!® Profile member and he/she wants to share something exclusively with his family members. Some of the members in the user's group may or may not be Yahoo!® Profile users. For the contacts who are not already Yahoo!® Profile users, sending them an update in this way would provide them with an opportunity to experience Yahoo!® Profile. The same holds true for other social sites.

Figure 2:
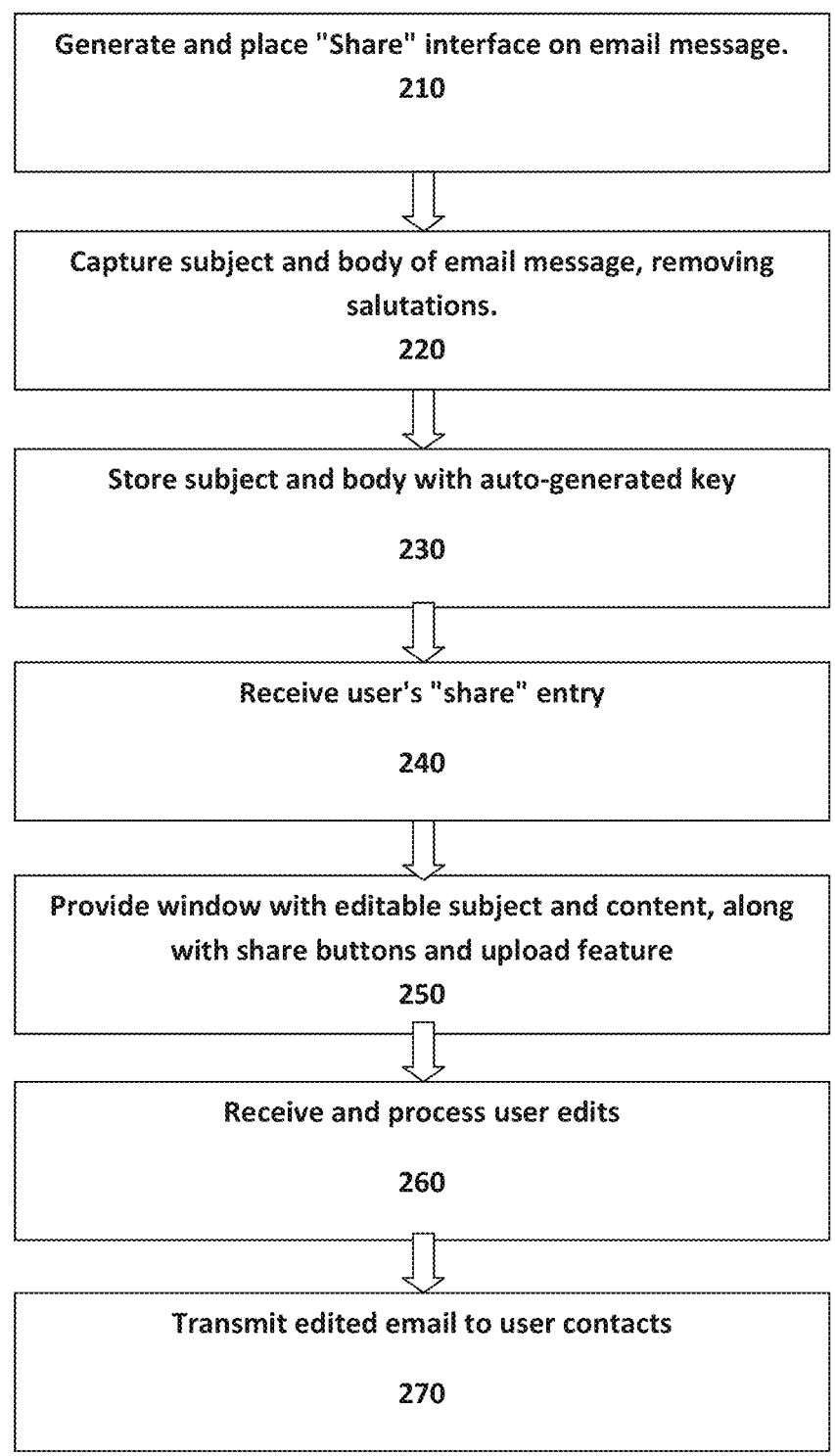
FIG. 2 is a flowchart of a method according to an embodiment of the invention.
Figure 5:
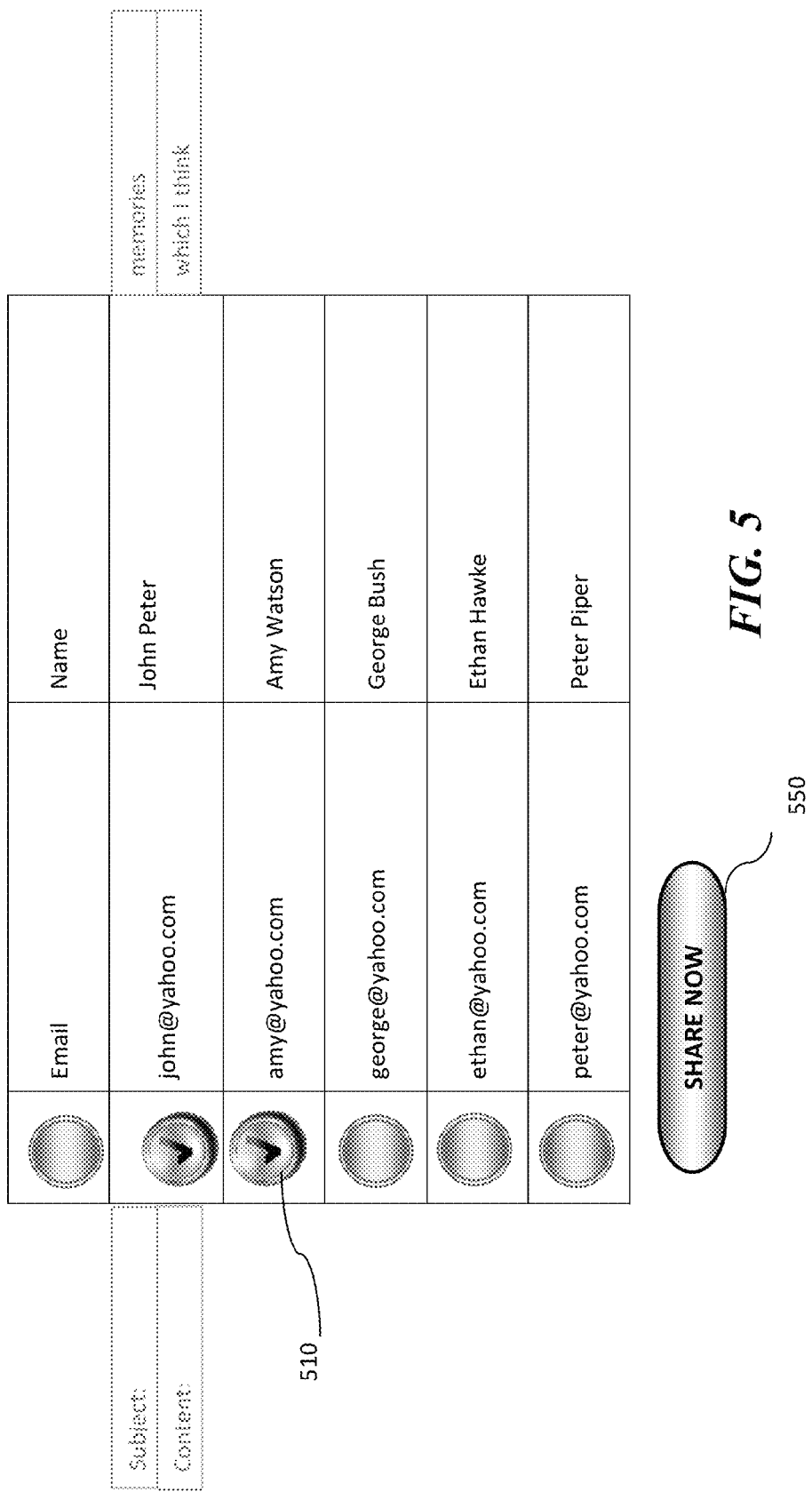
FIG. 5 shows an overlay with the user' contacts, according to an embodiment of the present invention.

Referring now to FIG. 2, we show a flowchart of the method for sharing emails according to an embodiment of the present invention. In step 210 we engage the "Share" user interface on email messages. In one embodiment, we place this interface on email messages in the form of an icon. Once the interface is activated by a user, we capture the subject and body of the email message and discard the salutation and any other non-essential part of the email. Then we store the subject and body of the email, along with an auto-generated primary key to associate the subject and body with the email in step 230. If the email does not contain a subject, we can provide a default subject, such as "email to share."

In step 240 when we receive a user's "share" entry (when the user clicks on the share icon), we provide a window with the captured editable subject and content, along with the share buttons in step 250. We also provide an upload interface so that the user can associate any additional content, such as video, image, audio, bar codes (such as quick response "QR" codes), uniform resource locators (URLs), and the like. By allowing the user to provide additional content to his/her email share, the user is able to further enrich and enhance the email share and make it more meaningful. In step 260 we receive and process any user edits and additional content. Then in step 270 we transmit the edited email to the user's contacts.

Figure 3:
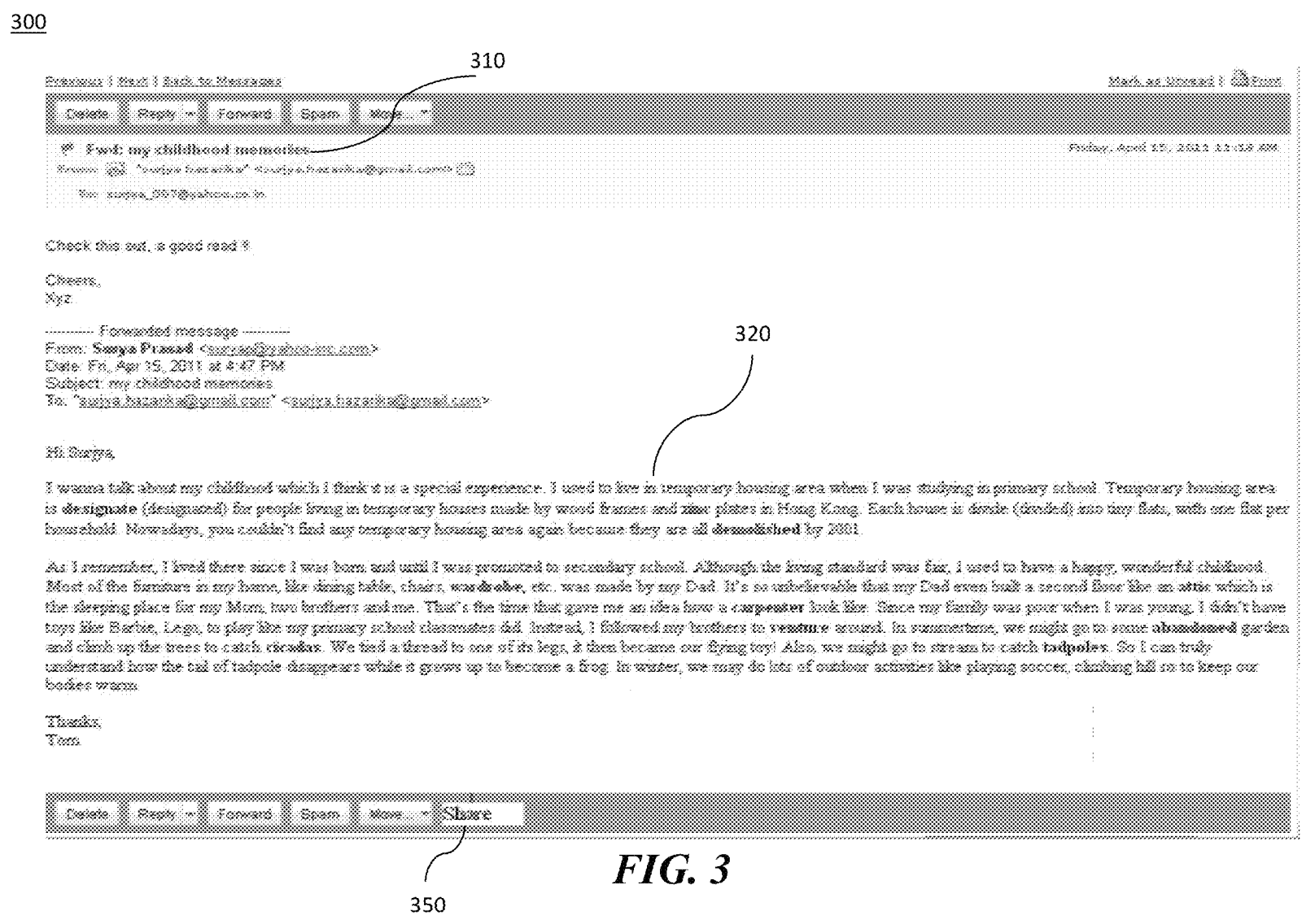

FIGS. 3, 4, 5, and 6 present examples of the interface for sharing emails, according to an embodiment of the present invention. In FIG. 3 we show an email 300 received by a user. The "Share" icon 350 is shown on the toolbar at the bottom of the email. The share interface is activated when the user clicks on the "Share" icon 350. This triggers the launch of a pop-up window or overlay 400 shown in FIG. 4.

The pop-up window or overlay 400 appears in edit mode with the email subject 310 as the default subject of the window 400 and the email content body 320 as the entire email content. The program logic has removed salutations and signature, if any. In this window 400, the user is able to add/remove/modify the content before sharing it. For example, the user may want to shorten the email, highlight certain phrases, or add some jokes/comments.

In addition, the user is able to upload and share photographs, documents, audio, video, bar codes, URLs and any other multimedia data that would serve to further enhance and/or support the email to be shared. For example, the user may want to add a URL to a site providing information about his/her hometown. In another example, a user may want to upload a video of the event that is the subject of the email.

QR codes are being used for a wide variety of applications. The user can upload a QR code to direct the reader to more information. Just as in known upload protocols, the user browses 475 for the desired file and clicks on the upload button 480 to attach it. The uploaded file will be stored and tagged with the same identifier as the email content and sent along with the edited content to be shared.

Two share buttons appear at the bottom of the window 400. The placement of the share buttons can be changed to suit the shape and size of the window 400. The "Share" button 450, when clicked, will send the edited email subject and body to all contacts listed within a user's social network (Facebook, etc.). Current data mining technology enables mining the user's on-line profile and social connection sites to determine the user's social contacts.

However, if the user wishes to share this email with only certain contacts, the user can select the second button 455 which activates another pop-up window or overlay 500. This window 500 can appear with all of the user's contacts as a transparent overlay. With this option, the user can specify only a selected few contacts from his/her address book.

This window 500 displays the user's contacts in such a manner that the user can easily identify, pick and choose the contacts with whom to share the email. Here we show the contacts presented with radio buttons 510. A radio button 510 is an icon that allows a user to choose one of a predefined set of options. Any appropriate graphical user interface element can be used as a selection feature. Selecting the top radio button 510 selects/de-selects all listed contacts.

Once the user has selected from among the available social contacts (mined from the user's social networking sites), the user clicks on the "Share Now" button 550. This activates the following procedures: the edited subject and content from the window 400 are saved into the mail server's database with an auto-generated primary key, along with any uploads. This key can be further tied to the message ID of the email, so that the user can later be shown whether the email was shared or not. The purpose of saving the shared content in this manner is to make it publicly accessible.

Figure 6:
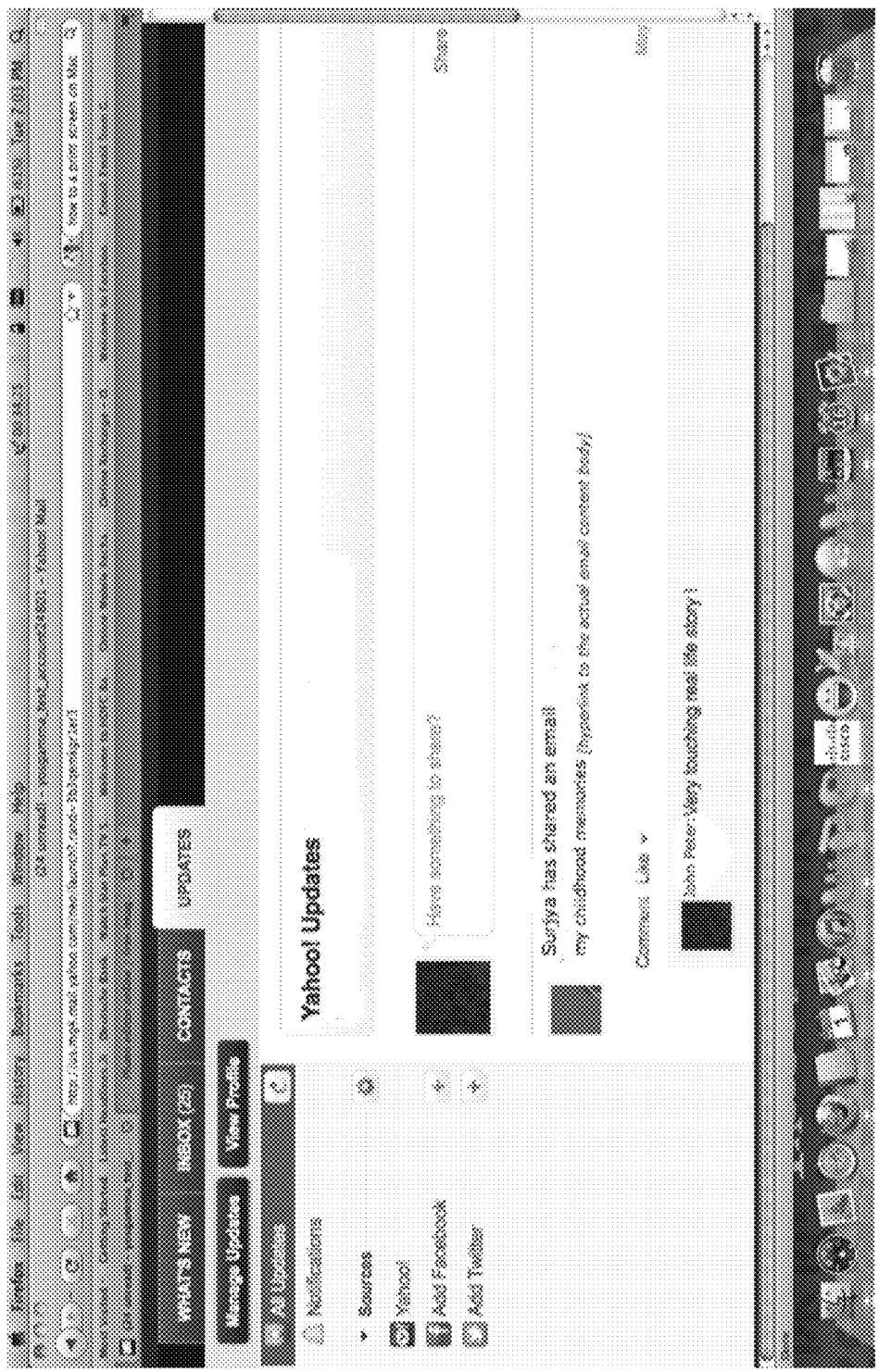
FIG. 6 shows an exemplary screenshot of a share notification, according to an embodiment of the present invention.

The primary key is stored, along with the user name, subject, and date-time when the update was shared. The update is then shared across the user's social contacts via Pulse, Messenger, email, and others. The user's connections/buddies receive the 'share' and can leave comments. FIG. 6 shows an example of a contact receiving a 'share' notification after logging in to his social account (mail, Facebook, etc.). We are able to provide a link to the shared email (along with any uploads), along with a preview. We also store the links to the shared emails.

Figure 7:
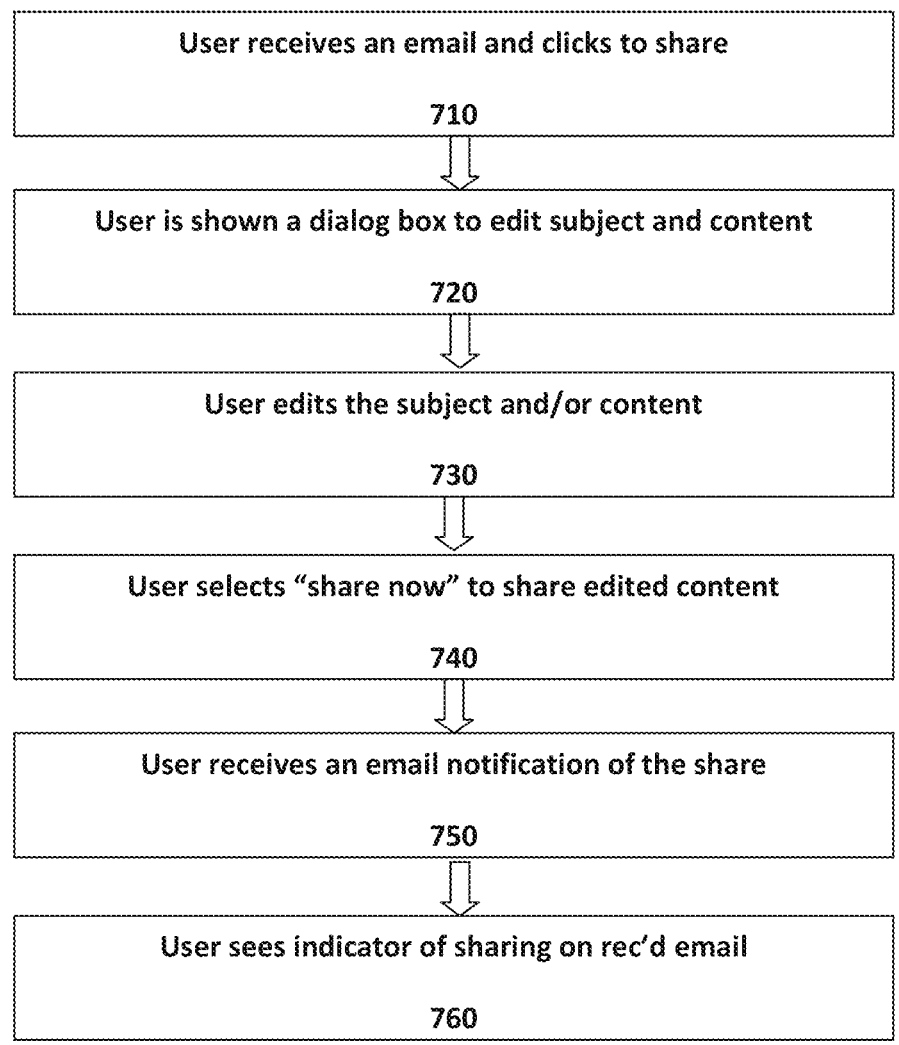
FIG. 7 shows a flowchart of the share process from the user's point of view, according to an embodiment of the present invention.

Referring now to FIG. 7 there is shown a flowchart of the method for email sharing from the user's point of view. The user receives the email and selects the share feature in step 710. In step 720 the user is provided with a dialog box with the subject and content in edit mode. In step 730 the user edits the subject and/or the content and in step 740 selects the "share now" button. In step 750 the user receives an email notification that the share was completed and in step 760 the user sees the indicator of sharing on the email notification.

Hardware Embodiment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Referring now to FIG. 1, there is provided a simplified pictorial illustration of an information processing system in which the present invention may be implemented. For purposes of this invention, computer system 100 may represent any type of computer, information processing system or other programmable electronic device, including a client computer, a server computer, a portable computer, an embedded controller, a personal digital assistant, and so on. The computer system 100 may be a stand-alone device or networked into a larger system. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device-computer system 100.

Computer system 100 includes processing device 102 which communicates with various input devices 104, output devices 106 and network 110. The processor 102 is connected to a communication infrastructure 122 (e.g., a communications bus, cross-over bar, or network). The processor device 102 may be a general or special purpose microprocessor operating under control of computer program instructions executed from memory 104. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

Memory 104 includes both volatile and persistent memory for the storage of: operational instructions for execution by CPU 102, data registers, application storage and the like. Memory 104 preferably includes a combination of random access memory (RAM), read only memory (ROM) and persistent memory such as that provided by a hard disk drive. The computer instructions/applications stored in memory 104 and executed by processor 102.

The I/O subsystem 106 may comprise various end user interfaces such as a display, a keyboards, and a mouse. The I/O subsystem 106 may further comprise a connection to a network such as a local-area network (LAN) or wide-area network (WAN) such as the Internet. Input devices 108, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

The computer system may include a display interface 1008 that forwards graphics, text, and other data from the communication infrastructure 1002 (or from a frame buffer not shown) for display on the display unit 1010. The computer system also includes a main memory 104, preferably random access memory (RAM), and may also include a secondary memory 112. The secondary memory 112 may include, for example, a hard disk drive 114 and/or a removable storage drive 111, representing a floppy disk drive, a magnetic tape drive, an optical disk drive, etc. The removable storage drive 111 reads from and/or writes to a removable storage unit 118 in a manner well known to those having ordinary skill in the art. Removable storage unit 118, represents a floppy disk, a compact disc, magnetic tape, optical disk, etc. which is read by and written to by removable storage drive 111. As will be appreciated, the removable storage unit 118 includes a computer readable medium having stored therein computer software and/or data.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

I claim:

1. A method for sharing email content, comprising:
using a processor device, performing acts comprising:
receiving from a user a selection of an email to share, the email comprising:
a subject;
a body;
a signature; and
a salutation;
providing for display, as part of a user interface of an email client and concurrently with at least some of the email:
a user interface forward icon; and
a user interface share icon different than the user interface forward icon;
upon receiving selection of the user interface share icon:
identifying the signature and the salutation as being non-essential parts of the email;
removing the signature and the salutation based upon the identifying;
capturing the subject and the body;
generating a primary key in association with the email;
storing the subject and the body with the primary key in a database of a mail server;
providing a first window in edit mode, wherein the first window comprises:
an upload button;
a first share button; and
a second share button different than the first share button;
receiving a file from a device of the user responsive to receiving a selection of the file via the upload button;
storing the file with the primary key in the database;
accessing the subject, the body and the file from the database using the primary key and transmitting a version of the subject, a version of the body and the file to one or more social contacts of the user responsive to receiving a selection of the first share button;
providing a second window comprising a selectable list of social contacts of the user responsive to receiving a selection of the second share button; and
accessing the subject, the body and the file from the database using the primary key and transmitting the version of the subject, the version of the body and the file to at least one of the social contacts of the user listed within the selectable list after receiving the selection of the second share button; and
providing for display to the user, as part of the email client, a representation of the email including an indication that the email was shared with social contacts via a social connection site different than the email client responsive to determining that a message identifier of the email is associated with the primary key.

2. The method of claim 1 further comprising:
applying edits to at least some content within the first window prior to transmitting the version of the subject and the version of the body.

3. The method of claim 1 wherein a first social contact of the social contacts of the user listed within the selectable list is associated with a first social connection site and a second social contact of the social contacts of the user listed within the selectable list is associated with a second social connection site different than the first social connection site.

4. The method of claim 1 further comprising receiving a selection of at least some of the social contacts of the user listed within the selectable list.

5. The method of claim 1 wherein a first social contact of the one or more social contacts is associated with a first social connection site and a second social contact of the one or more social contacts is associated with a second social connection site different than the first social connection site.

6. The method of claim 1 further comprising:
mining a profile of the user in one or more social connection sites to find at least some social contacts of the user.

7. The method of claim 1 wherein receiving the selection of the file comprises receiving a uniform resource locator.

8. The method of claim 1 wherein the file comprises a graphical image file.

9. The method of claim 1 wherein the file comprises a barcode.

10. An information processing system for sharing email content, comprising:
a processing device; and
a memory with program instructions stored therein, the program instructions, when executed by the processor device, causing a computer to perform:
receiving from a user a selection of an email to share, the email comprising:
a subject;
a body; and
a signature;
providing for display, as part of a user interface of an email client and concurrently with at least some of the email:
a user interface forward icon; and
a user interface share icon different than the user interface forward icon;
upon receiving selection of the user interface share icon:
identifying the signature as being a non-essential part of the email;

removing the signature based upon the identifying;
capturing the subject and the body;
generating a primary key in association with the email;
storing the subject and the body with the primary key in a database of a mail server;
providing a first window in edit mode, wherein the first window comprises:
a first share button; and
a second share button different than the first share button;
receiving a file from a device of the user responsive to receiving a selection of the file;
storing the file with the primary key in the database;
accessing the subject, the body and the file from the database using the primary key and transmitting a version of the subject, a version of the body and the file to one or more social contacts of the user responsive to receiving a selection of the first share button;
providing a second window comprising a selectable list of social contacts of the user responsive to receiving a selection of the second share button; and
accessing the subject, the body and the file from the database using the primary key and transmitting the version of the subject, the version of the body and the file to at least one of the social contacts of the user listed within the selectable list after receiving the selection of the second share button; and
providing for display to the user, as part of the email client, a representation of the email including an indication that the email was shared with social contacts via a social connection site different than the email client responsive to determining that a message identifier of the email is associated with the primary key.

11. The information processing system of claim 10 wherein the program instructions further comprise instructions for:
mining a profile of the user in one or more social connection sites to find at least some social contacts of the user.

12. The information processing system of claim 10 wherein the program instructions further comprise instructions for:
providing an interface in the first window for uploading the file.

13. The information processing system of claim 10 wherein the program instructions further comprise instructions for:
providing an upload button in the first window.

14. The information processing system of claim 10 wherein the email further comprises a salutation.

15. The information processing system of claim 10 wherein the file comprises a barcode.

16. The information processing system of claim 10 wherein receiving the selection of the file comprises receiving a uniform resource locator.

17. The information processing system of claim 10 wherein the file comprises a graphical image file.

18. A computer program product comprising a non-transitory computer-readable storage medium comprising computer executable instructions that when executed by a processor device, cause a computer to perform:
receiving from a user a selection of an email to share, the email comprising:
a subject;
a body; and
a salutation;
providing for display, as part of a user interface of an email client and concurrently with at least some of the email:
a user interface forward icon; and
a user interface share icon different than the user interface forward icon;
upon receiving a selection of the user interface share icon, performing:
identifying the salutation as being a non-essential part of the email;
removing the salutation based upon the identifying;
capturing the subject and the body;
generating a primary key in association with the email;
storing the subject and the body with the primary key in a database;
providing a first window in edit mode, wherein the first window comprises:
a first share button; and
a second share button different than the first share button;
receiving a file from a device of the user responsive to receiving a selection of the file;
storing the file with the primary key in the database;
accessing the subject, the body and the file from the database using the primary key and transmitting a version of the subject, a version of the body and the file to one or more social contacts of the user responsive to receiving a selection of the first share button;
providing a second window comprising a selectable list of social contacts of the user responsive to receiving a selection of the second share button; and
accessing the subject, the body and the file from the database using the primary key and transmitting the version of the subject, the version of the body and the file to at least one of the social contacts of the user listed within the selectable list after receiving the selection of the second share button; and
providing for display to the user, as part of the email client, a representation of the email including an indication that the email was shared with social contacts via a social connection site different than the email client responsive to determining that a message identifier of the email is associated with the primary key.

19. The computer program product of claim 18 wherein the file comprises a graphical image file.

20. The computer program product of claim 18 wherein the computer executable instructions further cause the computer to perform:
providing an interface in the first window for uploading the file.

21. The computer program product of claim 20 wherein the file comprises a barcode.

* * * * *